L. M. Rice.
Harvester Rake
N° 63427    Fig. 1.      Patented Apr. 2, 1867.
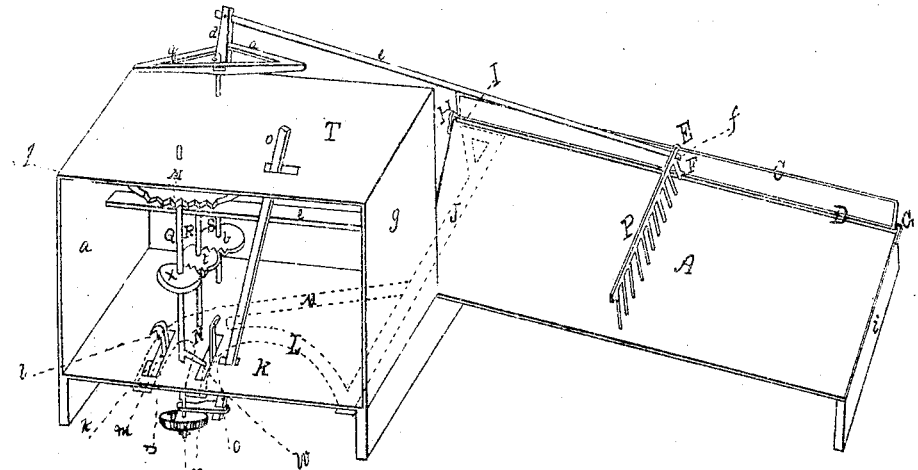
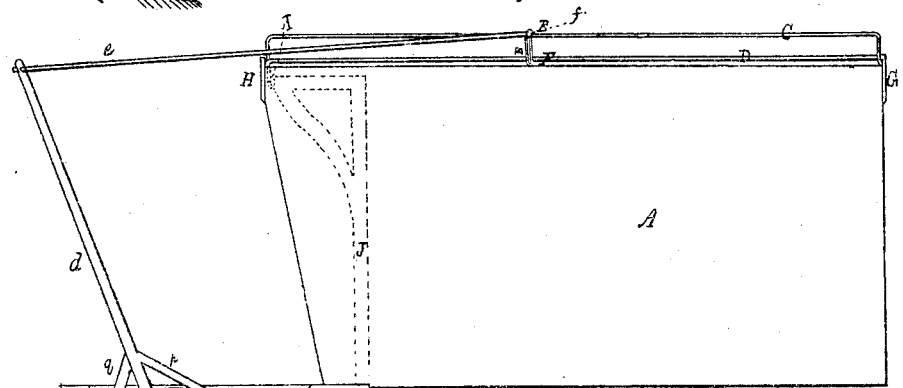
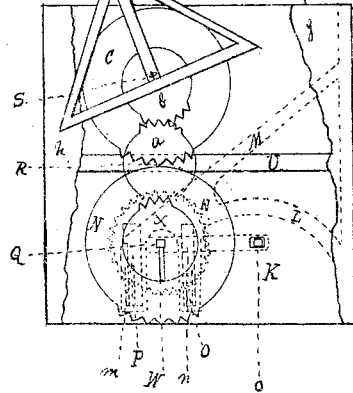
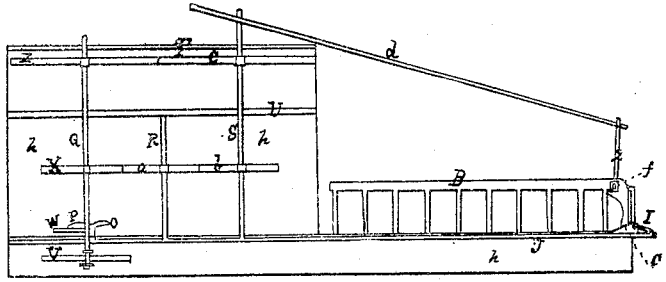
Witnesses            Inventor
Chas. J. Mahely      Lafayette M. Rice
W. Scott Williams

United States Patent Office.

LAFAYETTE M. RICE, OF OREGON, WISCONSIN.

*Letters Patent No. 63,427, dated April 2, 1867.*

IMPROVEMENT IN HARVESTER RAKES.

The Schedule referred to in these Letters Patent and making part of the same.

TO ALL WHOM IT MAY CONCERN:

Be it known that I, LAFAYETTE M. RICE, of Oregon, in the county of Dane, and State of Wisconsin, have invented a new and improved Mode of Raking Grain as the same is cut with a reaper; and I do hereby declare that the following is a full and exact description thereof, reference being had to the accompanying drawings, and to the letters of reference marked thereon.

The nature of my invention consists in working a reaper-rake with the revolving wheel of the reaper, while the rake is securely held in place at one end, and in lifting the free end and carrying the rake backwards and forwards with an oscillating and sliding motion; and I do hereby declare that the following is a full, clear, and exact description of the construction and operation of the same, reference being had to the annexed drawings, making a part of this specification, in which—

Figure 1 is a perspective view.

Figure 2, a horizontal section; and

Figure 3, a vertical section; and in which

A is the platform; B, the rake; C and D, rods, on which the rake slides; G and H, standards, in which the rod D is journalled; E and F, eyes, through which the rods run; I, a crank, connecting with the rods; J, a connecting-rod, in which the crank is journalled; L and M, arms, attached to the connecting-rod; N, the head of the arms or their intersection; O and P, the terminations of the two crotches into which the head is divided; Q R S, the upright shafts; T, the upper frame; U, a cross-bar; V, the drive-wheel, W a pin inserted in the shaft Q; X Z $a\ b\ c$, wheels, partly cogged upon their shafts; $d$, arm, connecting with rake by connecting-rod; $e f$, socket in rake; $g\ h$, sides enclosing the gearing; $i$, standard; $k\ l$, slots; $m\ n$, openings in bed-frame; $o$, lever. I construct my platform A, for receiving and holding the grain as it falls from the reaper or cutter, of wood, iron, or other material suitable, in the form of a parallelogram, with its backward side somewhat longer than its forward or front side to accommodate its left or inward end to the position of the rake at the point of delivery. The rake B may be of wood, iron, or other material, and it slides or oscillates upon two iron rods C and D, running through two eyes E and F inserted in the upper and lower part of the backward end of the rake or end farthest from the sickle, fitting loosely around the rods. The lower rod D is journalled into standards G and H attached to the outside corner of each end of the platform A on the backward side. The upper rod C is bent squarely down at each end so as to connect with and be fastened to the lower rod, forming a frame in the form of a parallelogram, thus giving the upper rod its support. The inner end of the upper rod C is carried down beyond its connection with the lower rod D, near the standard H, and bent into the form of a crank, I, or this crank may be otherwise constructed and attached at this point. Attached to the crank is the connecting-rod J, which passes underneath the inner end of the platform A, and the bed-frame K, and into this connecting-rod are framed the arms L and M, terminating in the crotched or double head N, each fork of which is bent squarely upward, the right-hand fork O being hooked backward or toward the attached end of the rake, and the other or left-hand fork P being hooked forwards or away from the attached end of the rake. There are three upright shafts, Q R S, inserted in the bed-frame so as to work or turn upon their journals, and the forward one of which, Q, and the backward one, S, are also journalled into the upper frame T, the centre one, R, being shorter, and journalled into a bar, U, extending transversely across the frame. The forward shaft Q is furnished with the drive-wheel V, (for the support of which the shaft is extended below the bed-frame,) the pin W, the small wheel X, and the large wheel Z. The second or middle shaft R is furnished with the small wheel $a$. The third shaft S is furnished with the small wheel $b$ and the large wheel $c$, of which the wheel V is cogged all around. The wheel $a$ upon the middle shaft is cogged on two opposite sides, the balance being left blank, or it may be cogged all around, and the balance of the wheels are cogged on one side and the balance left blank. The wheel $a$ meshes into both the wheels X and $b$. The wheel Z meshes into the wheel $c$, these two wheels being of the proper size to take up the space between the two shafts Q and S. Upon the top of the shaft S is placed the arm $d$, which is connected at its outer end with the connecting-rod $e$, with a working joint, and which connecting-rod is in turn connected at its other end with the rake-head in a hollow socket, $f$. There are also the additional parts, the standards G, and H, and $i$, and the bed-frame K; also the lever $o$ for throwing the machinery in and out of gear; also the braces $p$ and $q$ of the arm $d$, and the slots $k$ and $l$ in which rest the point P, and the openings in the bed-frame, $m$ and $n$.

The operation of my invention is as follows: Suppose the rake to be at the inner end of the platform at the point of discharge, and resting full length on the platform A. On turning the driving-wheel V in the direction of the arrow, the pin W will press against the hooked extremity O of the fork of the head N, attached by the arms L and M to the connecting-rod J, and bring that rod forward. This will, by means of the crank I, throw back the upper rod C to which is attached the rake B, which will by this motion be raised into a perpendicular position, and the wheels X $a$ and $b$ being at this point thrown into gear, by the partial cogging commencing to mesh, the rake will be moved along in this upright position to the other or outward end of the platform, at which point the pin W will have moved along so as to begin to press against the other hooked extremity P, which will then be in its most forward position in its opening $m$, and will press this backward to the extremity of the opening and into the slot $l$, carrying with it the arms L and M and the connecting-rod J. This will throw down the upper rod C, swinging it forward, and bring the rake B down on to the platform A. The cogs of the small wheels X $a$ and $b$ will now have passed by their points of contact, and the two wheels Z and $c$ will be in the required position for their cogs to come in contact, which will reverse the motion of the rake and bring it along the platform to the point of starting, where the gavel or bundle of grain will be discharged, and these motions will be repeated again, beginning with the raising of the rake.

What I claim as my invention and desire to secure by Letters Patent, are—

1. The combination of the five wheels X, Z, $a, b, c,$ arranged substantially as set forth, to effect the reciprocating motion of the rake.

2. The combination of the connecting-rod J, the crank I, the points or heads P O, the pin W, and the rods C D, to effect the raising of the rake and throwing it down.

LAFAYETTE M. RICE.

Witnesses:
  CHAS. T. WAKELEY,
  W. SCOTT WILLIAMS.